UNITED STATES PATENT OFFICE.

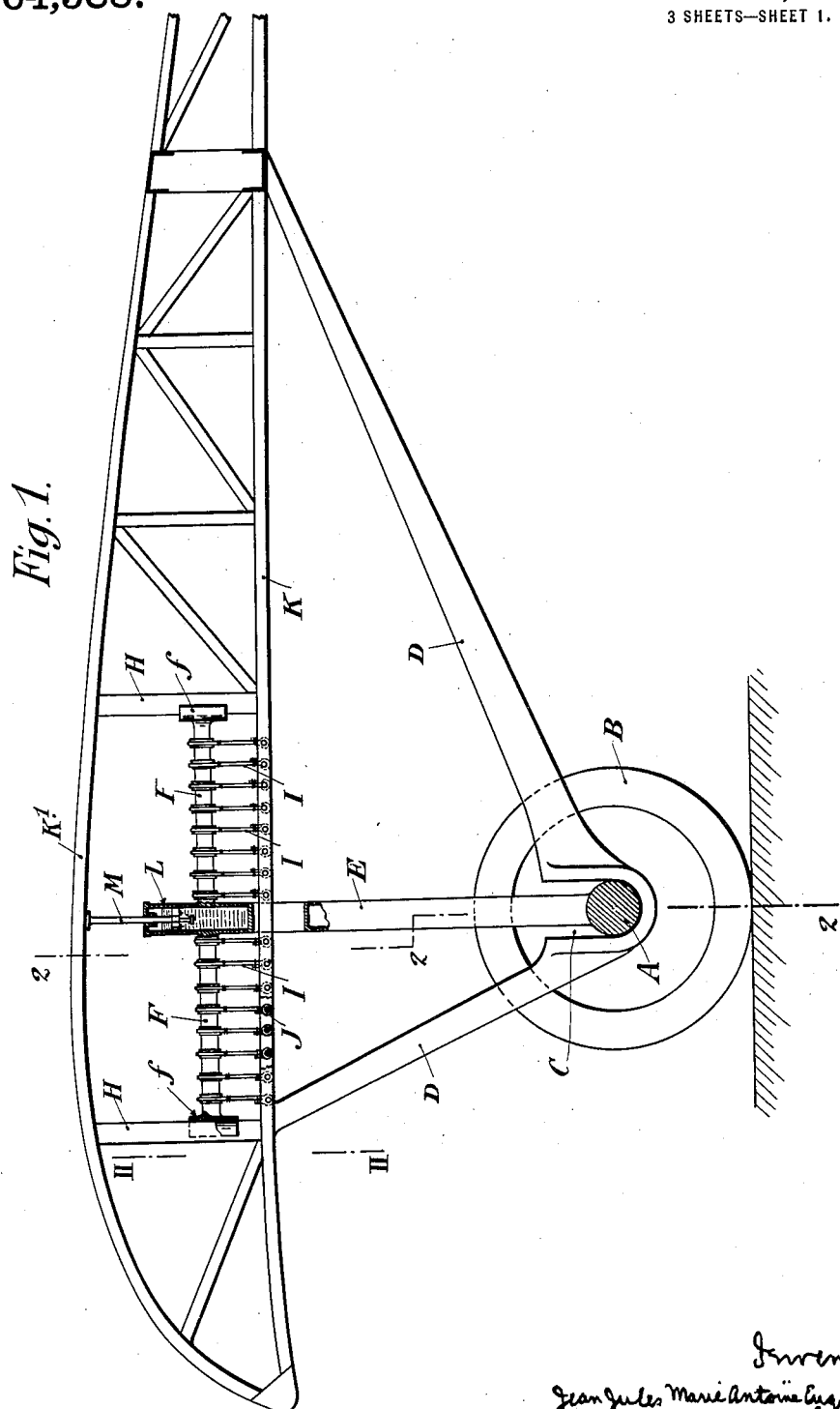

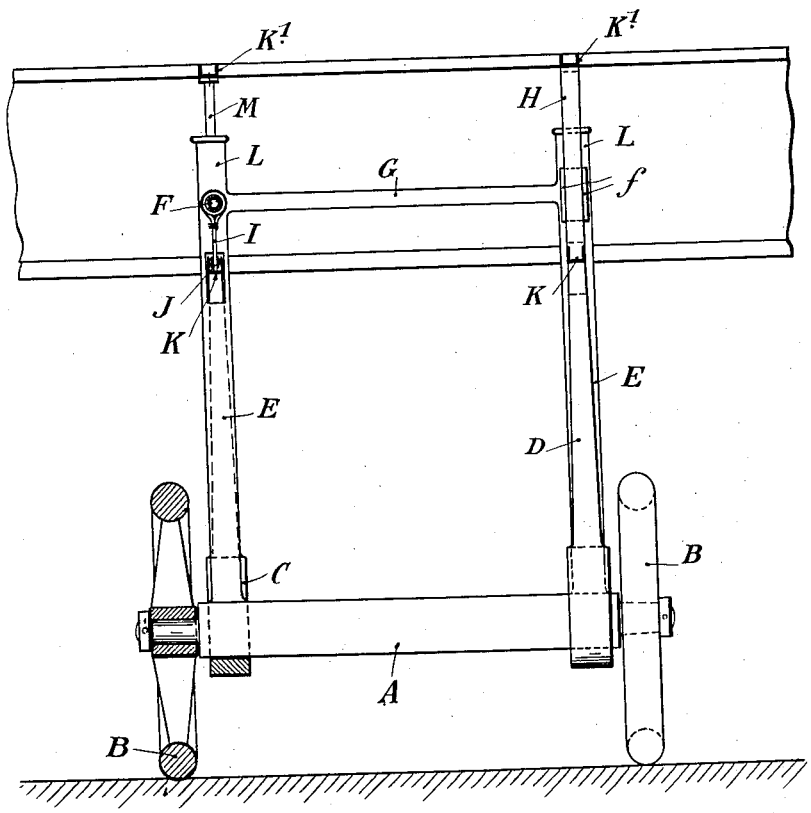

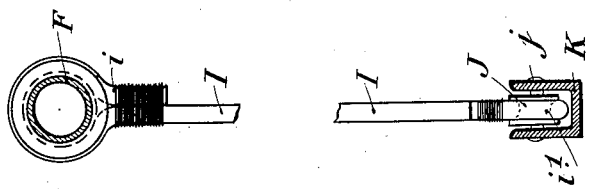
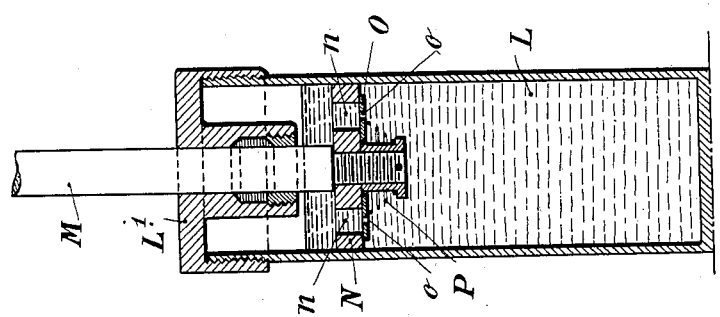
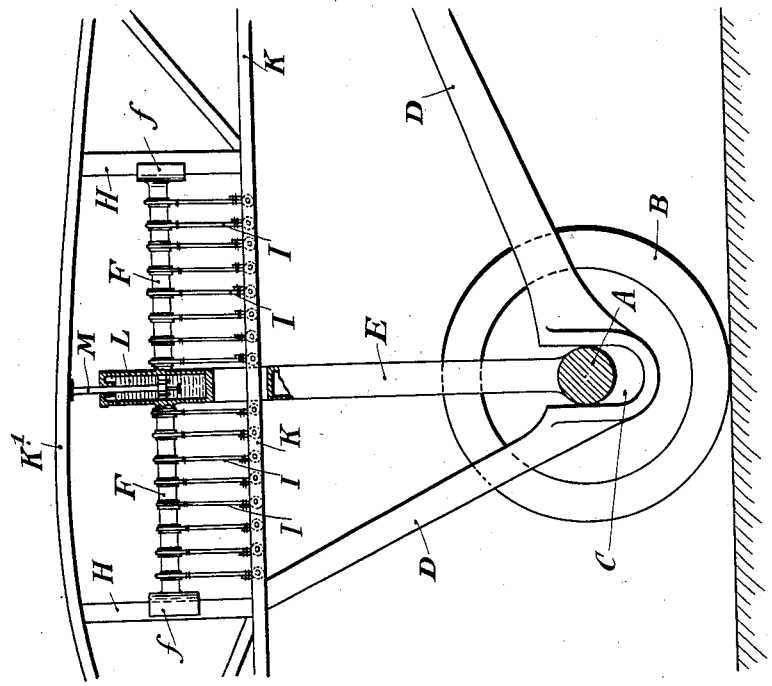

JEAN JULES MARIE ANTOINE EUGÈNE SCHNEIDER, OF PARIS, FRANCE.

SUSPENSION APPARATUS OF THE LANDING-CARRIAGES OF AEROPLANES.

1,364,588.  Specification of Letters Patent.  Patented Jan. 4, 1921.

Application filed February 28, 1920. Serial No. 362,116.

*To all whom it may concern:*

Be it known that I, JEAN JULES MARIE ANTOINE EUGÈNE SCHNEIDER, a citizen of the Republic of France, residing at Paris, France, have invented new and useful Improvements in the Suspension Apparatus of the Landing-Carriages of Aeroplanes, which invention is fully set forth in the following specification.

For the purpose of absorbing the shock experienced on the landing of aeroplanes, it has been customary hitherto to arrange an elastic connection between the axles of the landing wheels and a frame fixed to the car or the fuselage of the aeroplane. On landing the elongation of this band allows the aeroplane to descend as a whole relatively to the landing wheels that have come into contact with the ground.

When it is desired to split up the elastic band into a suitable number of elements for the purpose of increasing its dimensions and degree of sensitiveness to the desired extent, designers have been compelled to employ a rather bulky apparatus which has the drawback of increasing to a not inconsiderable degree the resistance to the travel of the aeroplane.

The present invention has for its object to obviate this drawback.

With this object, the landing carriage axle is guided simply in the usual frame that is fixed to the car or fuselage of the aeroplane, and is connected rigidly for instance by simple uprights, to a bar, cross-piece or other vertically movable part mounted in the thickness of the hollow aeroplane wing. The elastic band which is attached between the said movable part and a fixed part of the wing, is itself situated wholly in the latter.

A constructional example of this invention is illustrated in the accompanying drawings in which:

Figure 1 is a side elevation partly in section, at right angles to the axle of a landing carriage constructed according to this invention.

Fig. 2 is, as to one half, a section on the line 2—2 of Fig. 1, and, as to its other half, a cross section on the line II—II of Fig. 1.

Fig. 3 is a partial longitudinal section similar to Fig. 1, the parts being shown in the position they are caused to occupy as the effect of a shock at the instant of landing.

Fig. 4 is a detail view of an element of the elastic band.

Fig. 5 is a detail section of a hydraulic brake which may be employed instead of the elastic band or in combination with the latter.

In these figures, A is the axle of a landing carriage whereof B, B are the wheels.

According to this invention the shock-absorbing device which may consist of rubber bands, metal springs; or hydraulic, pneumatic or hydropneumatic devices, is mounted wholly in the thickness of the hollow wing between a fixed part of the latter and a member which is movable in the said wing and rigidly connected to the axle.

In the example shown, the axle A is guided near its ends in slides C formed in the stirrup-shaped frames D projecting from the under-side of the wing (or from the under-side of the car or fuselage). It is to be understood that these stirrup-shaped frames are carried by the wing when two landing carriages are employed symmetrically arranged with relation to the longitudinal axis of the aeroplane.

The axle is fixed by means of uprights E to two bars F mounted in the wing which may be stayed, if desired, by a cross member G and guided at their ends $f$ along uprights H of the framework of the wing.

The stayed bars F—G—F constitute the movable member which is mounted in the thickness of the hollow wing for attaching the shock-absorbing device or the elastic band which is attached in its turn to a fixed part of the wing.

This shock-absorbing device is itself situated wholly in the thickness of the hollow wing.

The shock-absorbing device may comprise for instance a plurality of elastic bands, such as rubber strips or cords I, the upper ends $i$ of which pass over a collar on the bar F, while their lower ends $i^1$ pass around a pulley J whose axle $j$ is carried by a longitudinal strut K of the framework of the wing.

The pulleys J may have their axles arranged at right angles to the landing carriage axle, and they may serve as guide pulleys, in which case the rubber bands are placed flat against the underside of the wing; this arrangement allowing of increasing considerably the length of the said bands.

A shock at the moment of landing, causes the wheels B to bear upon the ground. The attaching device F—G—F which is fixed to the landing carriage wheels and axle B—A—B then remains fixed as to height, whereas the aeroplane as a whole is allowed by the elasticity of the bands I to move down relatively to the landing carriage axle as shown in Fig. 3.

The shock-absorber proper may be of any suitable known type. For instance the movable member F—G—F mounted in the wing, may carry one of the elements, for instance cylinder, of a hydro-pneumatic brake, the other element of which, for instance the piston, is connected to the framework $K^1$ of the wing.

The drawings illustrate a device of this kind employed in combination with elastic bands. L are cylinders fixed to the bars F; they may be formed in the tubular uprights E that carry the axle A.

Rods M fixed to the framework of the wing carry the complementary member of the brake or of the shock-absorber of any suitable known type. In the example shown, each rod M carries a disk N pierced with holes $n$ that are normally closed on the lower side of the disk by means of a valve O which is pierced with small holes $o$ and is pressed against the disk by a spring P.

On landing, the aeroplane moves down relatively to the cylinders L, while in the latter the liquid is forced slowly from the under-side of the disks N to the upper sides thereof through the small holes $o$. The return of the parts into the normal position is facilitated by the action of the elastic bands I when they are employed in combination with the brakes, or it may be facilitated by the expansion of a metal spring interposed between the under cover $L^1$ of the cylinder and the part $K^1$ of the framework of the wing. In this return movement the liquid flows through the holes $n$.

Having now particularly described and ascertained the nature of my said invention and in what manner the same is to be performed, I declare that what I claim is:—

1. The combination of a hollow aeroplane wing, including the main frame thereof, a wheeled axle, a second frame carrying the wheeled axle and having at its upper end a member contained within the body of the wing and vertically movable therein, and shock-absorbing means contained within the hollow body of the wing and connecting said member of the second frame with the main frame of the wing to absorb shock imparted to the wheeled axle on landing.

2. The combination of an aeroplane wing, including the frame thereof, a wheeled axle, a second frame carrying the wheeled axle and vertically movable in the wing, guides on the frame of the wing engaging the movable frame to guide the latter in its vertical movements, and elastic means connecting the two frames to absorb the shock imparted to the wheeled axle on landing.

3. The combination of an aeroplane wing, including the frame thereof, a wheeled axle, a second frame carrying the wheeled axle and vertically movable in the wing, a fluid-brake interposed between the wing and the second frame to absorb the shock imparted to the wheeled axle on landing, and elastic means for moving the wing and the second frame relatively to each other to their initial positions after the absorption of the landing shock by the fluid-brake.

4. The combination of an aeroplane wing, including the frame thereof having a strut extending in the general horizontal plane of the wing, a bar vertically movable in the wing and extending in parallel relation to the strut, a wheeled axle, an upright connected at its lower end with the wheeled axle and attached at its upper end to the bar, and elastic means connecting the bar with the strut to absorb the shock imparted to the wheeled axle on landing.

5. The combination of an aeroplane wing, including the frame thereof having a strut extending in the general horizontal plane of the wing, a bar vertically movable in the wing and extending in parallel relation to the strut, vertical guides in the frame of the wing engaging the ends of the bar to guide the latter in its vertical movements, a wheeled axle, an upright connected at its lower end to the wheeled axle and attached at its upper end to the bar, and elastic means connecting the bar with the strut to absorb the shock imparted to the wheeled axle on landing.

6. The combination of an aeroplane wing, including the frame thereof having longitudinal struts extending in the general plane of the wing, a frame vertically movable in the wing comprising side bars connected between their ends by a cross-bar, each side bar being above and in parallel relation to one of the longitudinal struts, vertical guides in the wing frame engaging the ends of the side bars to guide the movable frame in its movements, a wheeled axle at their lower ends and attached at their upper ends to the movable frame, and elastic bands connecting each side bar with the strut immediately below to absorb the shock imparted to the wheeled axle on landing.

7. The combination of an aeroplane wing, including the frame thereof, a second frame vertically movable in the wing, a wheeled axle, an upright connected at its lower end with the wheeled axle and attached at its upper end to said second frame, a fluid-brake interposed between the upper end of the upright and the wing to absorb the shock imparted to the wheeled axle on landing, and elastic means connecting the two frames to aid in the absorption of the shock and operating to restore the frames to their initial positions.

8. The combination of a hollow aeroplane wing, including the main frame thereof, a wheeled axle, a second frame carrying the wheeled axle and having at its upper end a cross member contained within the body of the wing and vertically movable therein, and a series of elastic bands contained within the hollow body of the wing and connecting said cross member with the main frame of the wing to absorb shock imparted to the wheeled axle on landing.

In testimony whereof I have signed this specification.

JEAN JULES MARIE ANTOINE EUGÈNE SCHNEIDER.

Witnesses:
　ANDRÉ MOSTICKER,
　LOUIS GARDET.